G. W. BOLTON.
Milk-Can Skimmer.
No. 224,864. Patented Feb. 24, 1880.
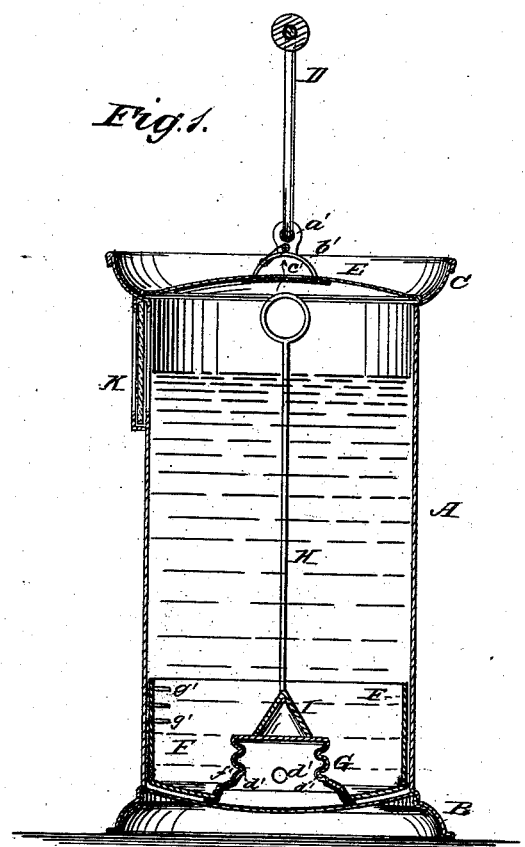
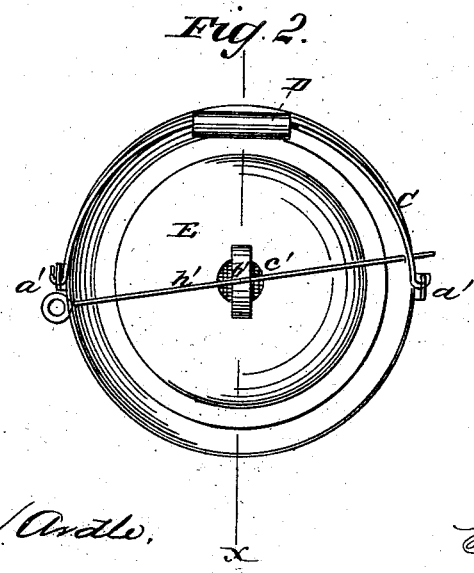
WITNESSES:
Francis McArdle
C. Sedgwick
INVENTOR:
G. W. Bolton
BY Munn & Co
ATTORNEYS.

UNITED STATES PATENT OFFICE.

GEORGE W. BOLTON, OF FREDERICKSBURG, IOWA.

MILK-CAN SKIMMER.

SPECIFICATION forming part of Letters Patent No. 224,864, dated February 24, 1880.

Application filed August 2, 1879.

*To all whom it may concern:*

Be it known that I, GEORGE WILLIAM BOLTON, of Fredericksburg, in the county of Chickasaw and State of Iowa, have invented a new and Improved Milk-Can Skimmer, of which the following is a specification.

Figure 1 is a sectional elevation of the device on line $x\ x$, Fig. 2. Fig. 2 is a plan of the same.

Similar letters of reference indicate corresponding parts.

The object of this invention is to furnish a milk-can provided with simple and efficient devices for cooling and gaging the milk and for removing the cream therefrom.

The invention consists of a skimmer which is a cylindrical box fitting quite tightly within the can, and having centrally fitted in its bottom an upward-projecting open thimble or ring that has a screw-thread cut around it and also has several perforations through its sides or base; and it further consists of a rod with a screw-cap on an end of it that may be screwed down on the thimble, partly or entirely closing the holes therein, so as to act, in effect, as a valve, and by this device of rod and screw-cap the skimmer may be raised and operated.

In the drawings, A represents the cylindrical portion of the can; B, the raised foot that supports it; C, the flaring and concave lip, to which are attached the ears $a'$, in which the bail D is secured.

E is the cover, provided with a handle, $b'$, and central opening, $c'$, that is covered by wire-gauze or other suitable material, for properly ventilating the can.

F is the cylindrical or box part of the skimmer, having soldered or otherwise fastened around the central hole in its bottom a thimble or deep ring, G, provided with holes $d'$ and screw-threads $f'$.

H is the rod, having on one end the conical screw-cap I.

K is a glass set in the side of the can for gaging the depth of cream formed on the milk, and $g'$ are pins projecting inwardly from the side of the skimmer to afford means of determining the depth of the cream in the skimmer.

$h'$ is a rod used for holding down the cover E by passing through holes in either side of the lip and over the cover-handle, as shown in Fig. 2.

The skimmer must be placed in the bottom of the can, with the holes in the thimble open, but with the rod and screw-cap attached. The milk is then introduced and permitted to remain at rest until the cream has risen, which can be determined by inspection through the gage K. The skimmer is then slowly drawn up by the rod, the milk passing out of the holes in it, until its upper edge appears through the upper surface of the cream. The screw-cap is then turned down to close the holes for a moment; then, as the skimmer is further drawn up, the holes are opened slightly, allowing the contents of the skimmer to flow downward until the pin-gage upon the skimmer corresponds with the gage of cream shown by the glass. Then the holes in the thimble are securely closed by screwing down the cap, and the skimmer withdrawn with the cream in it.

In cold weather a cloth with a hole in the center corresponding with the hole in the cover is placed inside of the cover to absorb the escaping moisture and prevent its condensation on the cover.

I am aware that milk-cans are constructed in which the milk is drawn off from the bottom, leaving the cream, which is subsequently poured out; but this method is a slow one, and results in a very considerable waste of cream from its adhering to the sides of the can.

By my device the operation is more quickly performed, and the tight-fitting skimmer keeps the sides of the can entirely free from adhering cream.

I am aware that it is not new to use a skimmer whose cut-off consists of a plate having a handle and holes, the latter corresponding to holes in the skimmer-bottom, to which said plate is pivoted.

What I claim as new is—

The skimmer formed of the centrally-apertured box F, having the thimble G, provided with holes $d'$ and screw-threads $f'$, the conical screw-cap I, and the rod H, as shown and described.

GEO. W. BOLTON.

Witnesses:
H. A. SIMONS,
S. H. PELTON.